(12) United States Patent
Cerri et al.

(10) Patent No.: US 11,663,676 B2
(45) Date of Patent: May 30, 2023

(54) COGNITIVE MANAGEMENT OF MULTIPLE SUBACCOUNTS

(71) Applicant: INTERNATIONAL BUSINESS MACHINES CORPORATION, Armonk, NY (US)

(72) Inventors: Fabio Cerri, Rome (IT); Alice Guidotti, Rome (IT); Bernardo Pastorelli, Rome (IT); Leonardo Rosati, Rome (IT)

(73) Assignee: International Business Machines Corporation, Armonk, NY (US)

( * ) Notice: Subject to any disclaimer, the term of this patent is extended or adjusted under 35 U.S.C. 154(b) by 918 days.

(21) Appl. No.: 15/843,035

(22) Filed: Dec. 15, 2017

(65) Prior Publication Data

US 2019/0147545 A1    May 16, 2019

Related U.S. Application Data

(63) Continuation of application No. 15/812,295, filed on Nov. 14, 2017, now abandoned.

(51) Int. Cl.
*G06Q 40/00* (2012.01)
*G06Q 10/10* (2012.01)
(Continued)

(52) U.S. Cl.
CPC ........... *G06Q 40/12* (2013.12); *G06Q 10/109* (2013.01); *G06Q 30/0201* (2013.01); *G06Q 30/04* (2013.01)

(58) Field of Classification Search
None
See application file for complete search history.

(56) References Cited

U.S. PATENT DOCUMENTS 4,851,650 A    7/1989  Kitade
7,725,387 B1   5/2010  Fitch et al.
(Continued)

FOREIGN PATENT DOCUMENTS

WO   WO2005124628 A2   12/2005
WO   WO2014172251 A1   10/2014

OTHER PUBLICATIONS

Caton et al., "A Social Compute Cloud: Allocating and Sharing Infrastructure Resources via Social Networks," in IEEE Transactions on Services Computing, vol. 7, No. 3, pp. 359-372, Jul.-Sep. 2014 (Year: 2014).*

(Continued)

*Primary Examiner* — Chesiree A Walton
(74) *Attorney, Agent, or Firm* — Mark Bergner

(57) ABSTRACT

Methods provide cognitive management of multiple subaccounts wherein processors are configured to determine an expense type for an input of an expense event to a linked account structure that links subaccounts that are each associated to different respective ones of a plurality of group members. In response to determining that the input expense event expense type most-strongly matches an expense type of a nearby in time calendar expense, methods allocate expense costs of the input expense to member subaccounts pursuant to a first expense allocation rule utilized in the nearby calendar event for allocating expenses. In response to determining that the input expense event expense type does not match the expense types of a nearby calendar events, methods further allocate the input expense event costs pursuant to a second expense allocation rule selected as a function matching the input event expense type to behavior data of a member.

8 Claims, 5 Drawing Sheets

(51) Int. Cl.
   *G06Q 30/02*   (2012.01)
   *G06Q 30/04*   (2012.01)

(56) References Cited

U.S. PATENT DOCUMENTS

| | | | |
|---|---|---|---|
| 7,954,698 B1 | 6/2011 | Pliha | |
| 8,266,024 B2 | 9/2012 | Hahn-Carlson et al. | |
| 3,301,502 A1 | 10/2012 | Livnat | |
| 3,412,624 A1 | 4/2013 | Scherpa et al. | |
| 9,355,155 B1 | 5/2016 | Cassel | |
| 2003/0236728 A1 | 12/2003 | Sunderji | |
| 2006/0224484 A1* | 10/2006 | Nhaissi | G06Q 40/00 705/35 |
| 2012/0232947 A1* | 9/2012 | McLachlan | G06Q 10/06 705/7.23 |
| 2013/0230246 A1* | 9/2013 | Nuggehalli | G06Q 10/10 382/176 |
| 2014/0188675 A1* | 7/2014 | Brown | G06Q 40/12 705/30 |
| 2015/0012328 A1* | 1/2015 | McLachlan | G06Q 10/06315 705/7.25 |
| 2015/0178725 A1 | 6/2015 | Poetsch | |
| 2015/0302531 A1* | 10/2015 | Thier | G06Q 40/10 705/30 |
| 2016/0078562 A1* | 3/2016 | Farrell | G06Q 10/10 705/30 |
| 2016/0364809 A1* | 12/2016 | Kamura | G06F 30/20 |
| 2017/0091689 A1* | 3/2017 | Elliott | G06Q 10/0631 |
| 2017/0323393 A1* | 11/2017 | Cussen | G06Q 40/12 |
| 2018/0053259 A1* | 2/2018 | Brahma | G06Q 20/145 |
| 2019/0102392 A1* | 4/2019 | Tseretopoulos | G06Q 40/02 |

OTHER PUBLICATIONS

Peter Mell et al., The NIST Definition of Cloud Computing, National Institute of Standards and Technology, Publication 800-145, 2011, entire document.

Anirudhan Adukkathayar et al., Secure multifactor authentication payment system using NFC, Computer Science & Education (ICCSE), 2015 10th International Conference, IEEE Xplore, Sep. 10, 2015, entire document.

U.S. Appl. No. 15/598,635, filed Nov. 14, 2017; Confirmation No. 9544.

* cited by examiner

COGNITIVE MANAGEMENT OF MULTIPLE SUBACCOUNTS

BACKGROUND

The present disclosure relates to the information technology field. More specifically, this disclosure relates to the management of bank accounts.

Virtual and other composite or linked account structures provide one-to-many models that enable the management of banking and other user accounts within accounting subledger structures that may be configured to user needs for segregating cash flows. Linked account structures may include multiple sub-accounts as needed to reflect an account setup of a general ledger.

SUMMARY

In one aspect of the present invention, a computerized method for cognitive management of multiple subaccounts includes executing steps on a computer processor. Thus, a computer processor is configured to determine an expense type for an input of an expense event to a linked account structure that links each of a plurality of subaccounts that are each associated to respective ones of a plurality of group members. The configured processor identifies historic calendar expense events that occur within a threshold time of the input expense event as nearby calendar expense events, and in response to determining that the input expense event expense type most-strongly matches an expense type of a first of the nearby calendar expense events relative to remaining others of the nearby calendar expense events, allocates expense costs of the input expense to respective ones of the member subaccounts pursuant to a first expense allocation rule that is utilized in the first nearby calendar event for allocating expense costs to the member subaccounts. The configured processor further allocates the expense costs of the input expense to respective ones of the member subaccounts pursuant to a second expense allocation rule for allocating expense costs that is selected as a function of strength of match of the input expense event expense type to behavior data of a responsible member of the group members that is identified as generating the input expense event, in response to determining that the input expense event expense type does not match expense types of the nearby calendar expense events.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
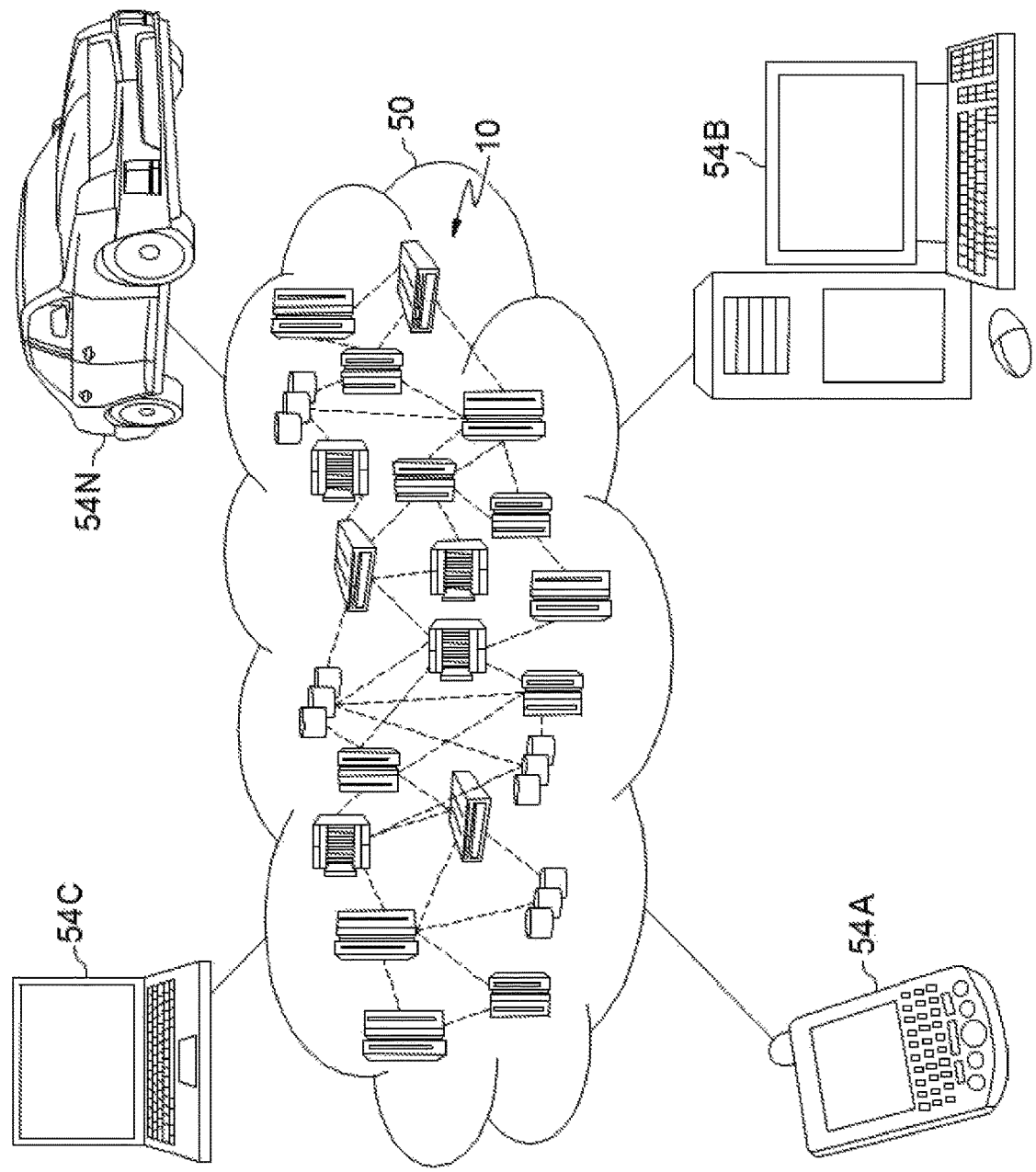
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
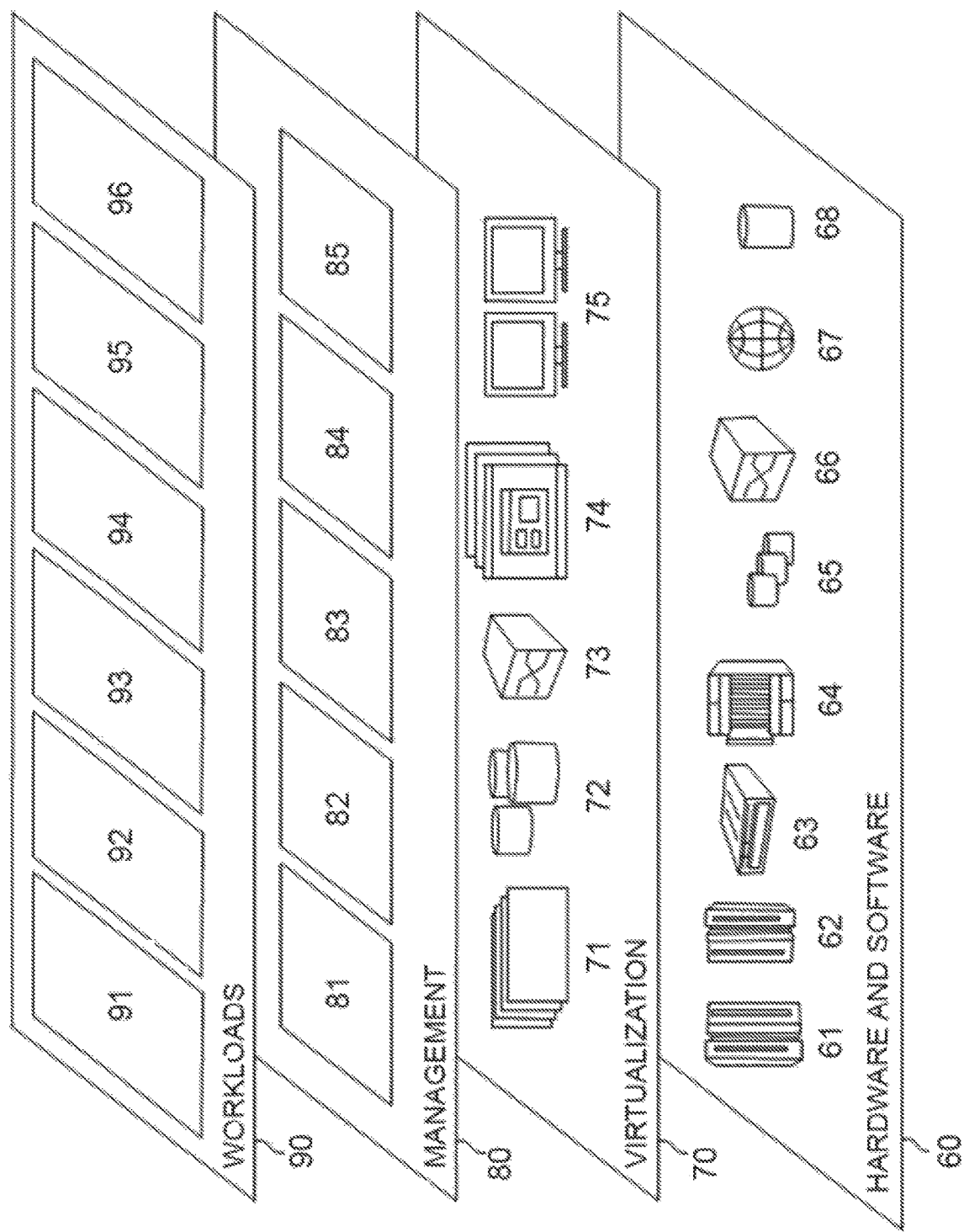
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a cognitive system for smart management of family bank accounts according to aspects of the present invention 96.

Figure 3:
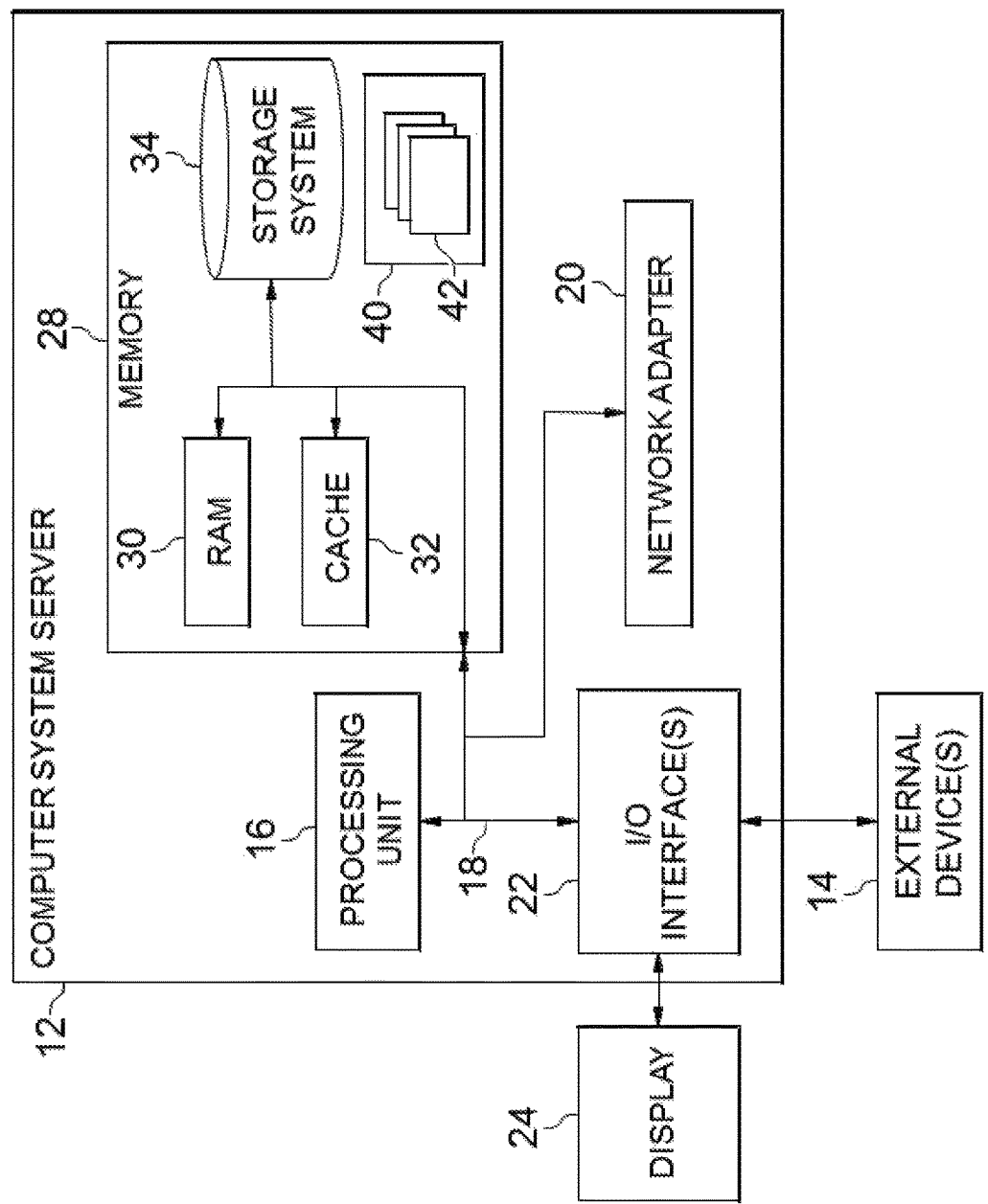
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
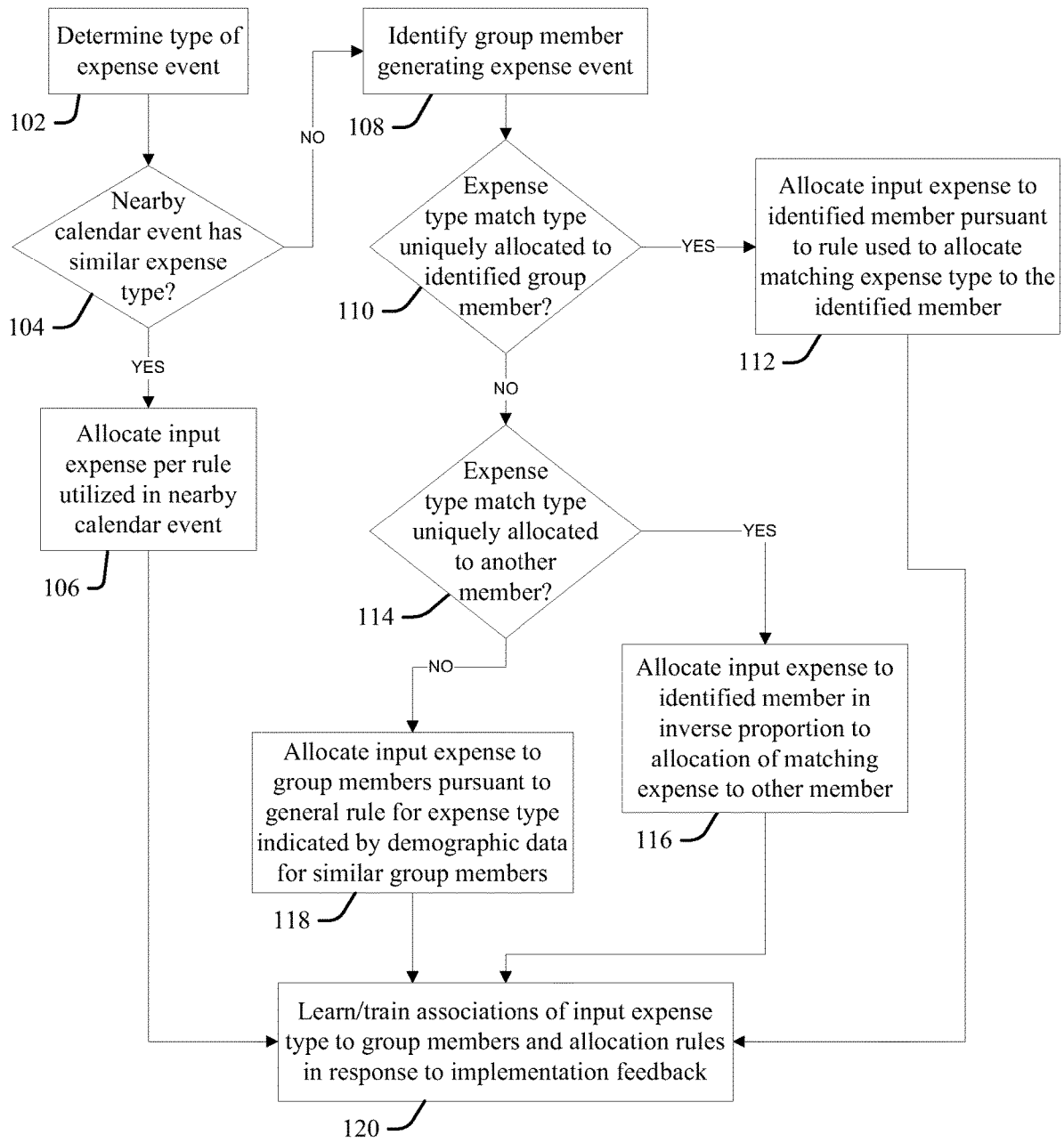
FIG. 4 is a flow chart illustration of an embodiment of the present invention.

FIG. 4 illustrates a cognitive system virtual account interface (account, dashboard, or other unifying structure) for management of a group of related, financial subaccounts according to the present invention, wherein each of the subaccounts are assigned to (associated with) a different unique member of a group of persons (for example, family members, organization members, social network members, etc.). At 102 a processor configured according to an aspect of the present invention (the "configured processor") determines an expense type classification for an input of an expense event to a linked account structure (sometimes referred to as a "virtual account") that links each of a plurality of subaccounts that are each associated to respective different ones of a plurality of group members, as a function of field data or text content analysis of structured or unstructured data of the input expense event. Illustrative but not limiting or exhaustive examples of expense types include a charge for remuneration or compensation for goods or services from a vendor, and a cash withdrawal charged against financial assets within a financial account.

At 104 the configured processor determines strength of relevance or relation of the input expense event data to historic calendar expense events as a function of the input expense event type and time and/or date, and more particularly, whether a nearby calendar expense event (one occurring within a threshold distance to a time, day of week, month or year of the input expense event) has an expense type that matches within a specified level of precision (is similar to) the determined type of the input expense event.

In response to determining at 104 a match to a type of a nearby calendar event within the specified level of precision, at 106 the configured processor associates the input expense event with the matching nearby calendar event and allocates the input expense costs to one or more of the sub-accounts pursuant to an expense allocation rule utilized in the nearby calendar event for allocating an expense of similar type. For example, if the similar expense type was shared equally between first and second ones of the members, then the input expense is shared equally by the first and second members, and apportioned (charged) equally to their respective sub-accounts.

Otherwise (in response to a failure at 104 to match the input expense event to a nearby calendar event of similar type of within the specified level of precision), at 108 the configured processor identifies which one of the group members generated (is responsible for generating, incurred, associated with, charged, signed for, is named within metadata associated with, etc.) the input expense event (for example, who made the purchase, to whom are goods being shipped, which member has an appointment for services, etc.)

At 110 the configured processor determines whether the input expense event type matches an expense type uniquely allocated to the identified group member, within personal expense information (data) of the identified individual member, or within group data (for example, as indicated by group rules or within the individual data of another member).

In response to determining at 110 that the input expense event type matches an expense type uniquely allocated to the identified group member, at 112 the configured processor allocates the input expense to identified member pursuant to a rule used to allocate the same (matching) expenses type to the identified member in the past: for example, if the identified member was allocated 50% of the cost of a matching type of expense, and the other 50% was allocated to another group member, then a rule that allocates 50% of the cost of the input expense to each of the identified member and the other member is selected at 112.

In response to determining at 110 that the input expense event type does not match an expense type uniquely allocated to the identified group member, at 114 the configured processor determines whether the input expense event type matches an expense type uniquely allocated to other, different ones of the group members, within personal expense information of the group or of the respective individual members. More particularly, the configured processor selects one of the members having the strongest relevance or association to the expense type (one that is most strongly-matched, if more than one member is matched to, associated with or relevant to the input expense event type) as the one "uniquely allocated" to the input expense event type.

If the expense is matched to an expense type uniquely (or most -strongly, in the case of multiple matches) allocated to another group member at 114, then at 116 the configured processor allocates the input expense to the member identified as generating the input expense in inverse proportion (share) to an allocation (shared) of the matching expense type to the other member. This implements a policy presumption that the member generating the expense has performed an associated task (good purchase, retention of services, etc.) that is usually is performed by the other member, and wherein the identified member is presumed to be responsible for a share of the expense cost in inverse (reversed) proportion to that historically borne by the other member.

If the expense is not matched to one that is uniquely allocated to another group member at 114, then at 118 the configured processor allocates the input expense to the group member subaccounts pursuant to a general rule for the input expense type indicated by demographic data for similar group members. Thus, where there is no strongly matching transactional history for any of the members with respect to the type of the input expense, the configured processor applies an allocation rule typically applied between members of other groups having similar (matching) demographic characteristics. For example, for a family grouping of members comprising parents and children, an education type of expense (school tuition or fees, music lessons, etc.) incurred by any of the members is allocated at 118 evenly among the parents in response to determining that parents within other family groupings having similar demographic attributes (similar total amount of family assets, only two parents with no other persons indicated as financially responsible for care of the children, each parent contributing yearly income within 10% of each other) generally allocate educational expenses between parent subaccounts equally.

At 120 the configured processor updates (trains or learns) a knowledge base of allocation rule associations to the input expense type, and of actual, historic allocations of the expense type among the group members, in response to the allocations made at 106, 112, 116 and 118, and to any user feedback, including confirmations, modification or overrides of the allocations at 106, 112, 116 and 118 by the group members or a service provider administering the virtual account structure. Thus, the configured processor trains and improves, including via learning new allocation rules or deleting or revising rules with respect to expense type and member associations, in response to feedback iterations with respect to allocation decisions at 120.

Thus, aspects of the present invention properly assign to each account owner of the group an appropriate share of an expense (in part as confirmed by feedback at 120), even where the input expense event has never been performed by the account owners. This is achieved by making allocation determinations based on analogous behaviors of the account owners, or of demographically similar users.

Aspects of the present invention merge individual member bank accounts into a virtual family account while keeping the underlying, real, accounts separate. Expenses are calculated globally on the family account, via global, family management structures, and differentially allocated and automatically charged to (or taken from) one or more of the underlying individual, real accounts. By aggregating data, aspects determine whether a given expense should be taken from one or another account, or both in a given percentage, wherein the percentage may be calculated or otherwise based on relative member incomes, dynamic total of assets, etc.

Aspects may make underlying account allocations based on transaction type: for example, all expense in "women's boutiques clothes" might be taken from an adult female family member having delegated authority or responsibility for her own attire purchases, including as a function of exceptions to the rule for gift purchases (for example, during holiday shopping seasons or periods, or within a threshold time from another family member's birthday). Other expense categories may be automatically allocated among multiple family member: for example, grocery, vacation, and children's education expenses may be allocated among the accounts of parents.

Bank accounts of partners are merged in a unique virtual account, wherein real physical accounts remain separate. Incomes of partner may be fed into their own real accounts, wherein each partner is automatically charged for contributions to common expenses in a given percentage, but wherein personal expenses are charged only to each partner's own physical account. Aspects may also generate and display a single, overall expense view of the virtual account, enabling easy family understanding and management of the virtual structure.

Cognitive aspects of the present invention determine which expenses should be taken by each account and which should be shared in a given percentage, which may be defined by tuples of different variable values. Illustrative but not limiting or exhaustive examples of variables utilized in aspects of the present invention include the following:

"Variable $person" or "MemberName" are variables defined to represent a person that is responsible for or associated within an expense cost and/or expense event, wherein values identify the unique identity of each member, and optionally their group membership status relative to other members of the group (teammate, father, aunt, etc.). Values may be determined by credit card number or account used for a transaction, or it may be determined by a location of the person that is matched with the place and time of creation of the expense. For example, when a family on-line account is used to generate an expense, the person's location could be used to determine who is making the expense ("$person_location/$shop_location").

"Variable $shop" is a variable defined to identify a merchant or service provider charging the expense for goods or services, which may determinative in combination with a location variable ("$shop_location") that indicates a physical or virtual address (Internet Protocol web site uniform resource locator (URL) address) or other location of the merchant/service provider, and which may be combined with a merchant or service provider type variable ("$shop_type").

"$account" or "SharedBankAccount" values identify a financial account of the member available for charging expense amounts against that are allocated to member by the virtual account system.

"Variable $time" is a variable defined to represent a time/date or period of time during which the expense is made.

"DemographicData" and "Variable $habit" variable represent group member habits, tastes or other preferences that are determinable as a function of web navigation history, and various individual attributes of the member that are useful in defining membership status within the group relative to other members, and for finding matching to and distinguishing from persons outside of the group for the purposes of identifying and defining allocation rules from the history and behaviors of the other persons. For example, web browser history may indicate that the member likes certain sports or sports teams, or arts, wherein a correlation to a "$shop_type" category may indicate a likelihood or presumption that the member with the matching "Variable $habit" variable is partially or wholly responsible for a purchase expense. Illustrative but not limiting or exhaustive examples of demographic attribute values include age, marital status, employer, job title, type of employment, school attended, degree, field of study, number of children, yearly income, credit rating, etc. Demographic and other data may be encrypted and thereby accessible only by the configured processor or others with appropriate access, to ensure security of confidential data. Data may be automatically acquired by the configured processor from public and private domain sources, including credit rating agencies and government entities.

The "Share" variable value may be set to all, none, or some default percentage or proportionate value (for example, 50% to share with another parent member in the case of two parent members). It may also be a dynamic field, for example a formula field that determines a ratio or percentage value as a function of comparing values from other data fields, such as a ratio of a current salary or individual assets of the member to the current salary/assets of another member, so that as the current member's salary or assets value grows larger than the other member's salary/ assets, the share of an expense type identified in the tuple that is allocated to the current member as an expense proportionately grows. Aspects may consider a variety of asset data items in setting relative sharing ratios, and illustrative but not limiting or exhaustive examples include total and periodic balances of banking account values and transactions, pension income, tips, rental income, etc.

Aspects of the present invention build and maintain a knowledge base that stores variable values representing members and their respective habits and behaviors and is used to process transaction debit and addition amount input into the virtual account. Aspects train or learn attributes of the knowledge base from direct and indirect feedback inputs, revising and developing images and perceptions of member habits and behaviors.

Thus, in response to determining that a first member with no positive habit variable values or purchase history of electronic goods has purchased an electronic gadget, aspects may presume that this purchase is on behalf of another, second member that has positive habit variable values or purchase history of electronic goods, wherein the expense is automatically allocated against an account of the second member. However, the weighting/presumption may be lowered, or even revalued to presume that the purchase is the responsibility of the first member in response to determining that the purchase time variable value is during a known gift-giving period relative to the second person (for example, within 14 days in advance of the birthday of the second person); or if a habit/preference variable value indicates that the first member preferences to utilize the most-recent available models of cellular mobile device technology (that their model is never more than one year old), and that purchased item is a latest smart phone model of the type that the first member uses.

Aspects of the present invention also determine a threshold of expenses each person can make on his own account without affecting the family's overall budget. This threshold may be dynamically calculated as a function of current income inflows and expense outflows, and further to track trending values established by other families sharing common demographic variable values (size of family, average spending of households within the same domicile zip code, city, or state, or having same employment types or salary level, etc.)

During aspect initialization (ramp-up) structured and unstructured data is gathered to classify merchants in a first learning phase by assigning variables from a global goods provider typology (for example, supermarket, electronics, women's wear, children's wear, men's wear, jewelry, pharmacy, sports, furniture, etc.); service providers are similarly classified by assigning variables from a global service provider typology (for example, medical, auto repair, legal, education, real estate, architecture, interior design, etc.). A knowledge base of expense type variables is built from expenses linked or associated with the merchant and service provider types, and wherein variable values are periodically refined based on feedback acquired during the systems operation. On-line merchants or service providers can have multiple classifications, according to the goods or services offered. The aspects learn appropriate variable values by analyzing the history of expenses as a function of keywords, tags and other metadata. For instance, if several expenses from a merchant contains the word "pharmacy" within metadata in their description, a pharmacy classification value is created and populated in a merchant type variable field.

In another learning phase members may be classified into subgroups, for example, based on family type and expense behaviors, which may include assigning to each subgroup expense a responsible account owner. For example, in an extended family with children from different parents, expenses of a children of only one parent might be the responsibility of only that parent, while the expenses of other children are shared by current parents. Subgroup variable values as to family type and/or member identify may be collected as input at systems initialization, or they may be automatically and dynamically updated or retrieved (for example, in response to a subsequent input of governmental authority data indicative of family status changes).

Aspects also analyze the individual financial account data for a member to determine expense behavior patterns, to determine likely expense allocations of the virtual account from a strength of match to the determined expense behavior patterns. In this way, each person's behaviors are collected and used after merger of individual accounts into the virtual account to assign the expenses. For example, a behavior pattern determined for one group member may comprise the use of cash withdrawals from automatic teller machines (ATM's) within a geographic region or proximity to each other for a housekeeper type of expense, as indicated by a substantial uniformity in amount and frequency (for example, 95% or more of the time on the same day of the week that is indicated weekly in a personal calendar as a housecleaning appointment, and in the same amount at least 95% of the time; or only within temporal association with vacation periods of time, such as within 30 days after the conclusion of a vacation rental), and wherein the proximity is relative to the location of the property cleaned or of a cleaning service provider. Accordingly, in response to matching a first cash withdrawal by this person to the pattern as a function of time and amount and geographic location (within specified precision thresholds), aspects automatically determine that the expense is a housekeeper expense, and allocate the expense between member accounts pursuant to rules established for housekeeping expenses, wherein another cash withdrawal that does not meet this or any other special rule pattern is treated as a common expenses under allocation presumption rules.

Expense allocations defined by rule tuples may be based on (in proportion to) relative levels of income, or contributions to overall income, attributed to each group member. Some personal (individual) income may be excluded from shared income or shared expenses; for example, a cash payment received by a first member to compensate for a loss experienced by that member may be excluded from salary or other income contributions, and thus not considered in a corporate, family budget that is based on relative earnings.

Some aspects build, train and leverage a knowledge base of tuples of variable values. In one example a goods or service provider ("vendor") is be defined by a tuple comprising "VendorName_Typology1_Typology2_ . . . TypologyN" for "N" different types of expenses that are associated with the vender identified by the "vender name" value, wherein typology value indicates a type of product sold by the vendor. Aspects update the typology values based on group member transactions, adding typologies to the tuple when a new type of transaction is discovered, and delete them when they age out (for example, when a given typology does not appear within any transactions with the vendor for a specified lapse of time that is chosen to indicate that the association is stale or otherwise no longer valid).

In one example group members are be defined by a tuple comprising "MemberName_SharedBankAccount_DemographicData1_
DemogrpahicData2_ . . . Demographic DataX_Member-Salary_MemberIncome_TypologyName1-
TypologyShare1_TypologyName2-TypologyShare2_ . . . TypologyNameM-
TypologyShareM_CalendarEvent1_CalendarEvent2_ . . . Important Calendar Event X."

Expense allocation rules may be defined by sets of tuples for each member user, wherein each tuple within a set defines the values of a rule for allocating or sharing a specific expense. In one example of an allocation rule tuple "MemberName-A_Location-A-CalendarEvent-A_Share-All," the share variable value of "Share-All" specifies that all of the expenses for an input expense event generated by or associated with a first group member identified by "MemberName-A" from "Location-A" (a web page address of vendor, or an ATM location of a withdrawal) and that occur within a threshold time from the calendar event defined by the value of "CalendarEvent-A" are allocated against the subaccount of the first member. Thus, the value of "CalendarEvent-A" may be the birthday of another member, wherein the system recognizes that the purchase is by default a gift from the first member for a birthday present for the other, second member of a family group.

Aspects of the present invention may generate rule tuples automatically. For example, aspects may collect personal financial data for each group member (including expense and banking activity); identify the relative or total values of expense types that are correlated to define tuple variable values (as a function recognizing related keywords within the metadata expense transactions within the collected member financial data, via text analysis); and generate rule tuples that assign shares of the identified expense types in proportional amounts determined by summing the expenses of each members for each typology and then dividing by the sum of the historic expenses across the members.

Figure 5:
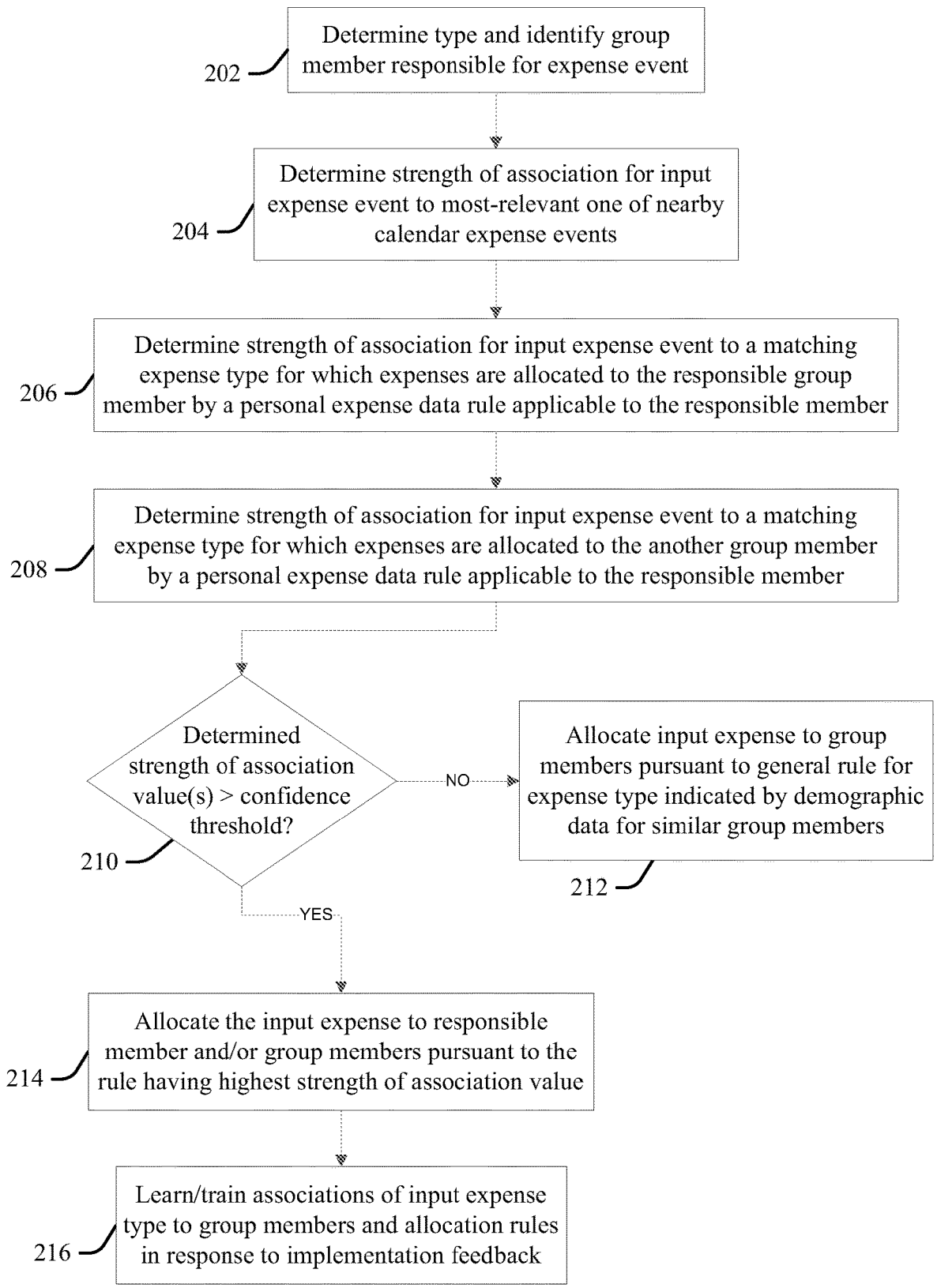
FIG. 5 is a flow chart illustration of an alternative embodiment of the present invention.

FIG. 5 illustrates an alternative embodiment of the present invention that arbitrates between allocation rules based on relative weightings or other values indicative of strength of association or confidence in rule selection. Thus, at 202 a processor configured according to an aspect of the present invention (the "configured processor") determines an expense type classification for an input of an expense event (defined by time and date of occurrence data) to a unified virtual account, and identifies which one of the group members generated (is responsible for generating, incurred, associated with, charged, signed for, is named within metadata associated with, etc.) the input expense event, as a function of field data or text content analysis of structured or unstructured data of the input expense event.

At 204 the configured processor determines a strength of association value for the input expense event that quantifies a degree of association to a most-relevant one of nearby calendar expense events (those occurring within a threshold distance to a time, day of week, month or year of the input expense event, and that have an expense type that matches within a specified level of precision (is similar to) the determined type of the input expense event as a function of the input expense event type and time and/or date). The "most-relevant" one of the nearby calendar expense events is identified as a function of having a higher confidence of association to the input expense event relative to other nearby calendar expense events.

At 206 the configured processor determines a strength of association value for the input expense event to a matching expense type for which expenses are allocated to the responsible group member by a personal expense data rule that is applicable to the responsible member, and that is used to allocate costs of the matching expense type to the group members.

At 208 the configured processor determines a strength of association value for the input expense event to a matching expense type for which expenses are allocated to another member of the group, by a personal expense data rule that is applicable to the other member, and that is used to allocate costs of the matching expense type to the group members. More particularly, the configured processor selects one of the other members having the strongest relevance or association to the expense type (one that is most strongly-matched, if more than one member is matched to, associated with or relevant to the input expense event type).

At 210 determines whether any (at least one) of the determined strengths of association values meet a minimum confidence threshold for an association. If not, then at 212 the configured processor allocates the input expense to the group member subaccounts pursuant to a general rule for the input expense type indicated by demographic data for similar group members (for example, as discussed above with respect to FIG. 4, 118).

If the boundary threshold condition is met at 210, then at 214 the configured processor allocates the input expense to the responsible member and/or group members pursuant to the rule having the highest strength of association value relative to the input expense event expense type.

At 216 the configured processor updates (trains or learns) the knowledge base of allocation rule associations to the input expense type, and of actual, historic allocations of the expense type among the group members, in response to the allocations selected at 212 or 214, and to any user feedback, including confirmations, modification or overrides of the allocations by the group members or a service provider administering the virtual account structure. Thus, the configured processor trains and improves, including via learning new allocation rules or deleting or revising rules with respect to expense type and member associations, in response to feedback iterations with respect to allocation decisions at 216.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising, using a configured processor:
    inputting, into a distributed cloud computing environment (DCCE), a current expense record (ER) (CER), wherein:
    an ER is defined as having attributes that include a description, an amount, and a time that is a date and time of ER occurrence; and
    the CER has both structured and unstructured data that collectively comprise keywords, text data, tags, and metadata;
    determining, via content analysis, a type of the CER;
    linking the CER to a virtual group account (VGA) provisioned within the DCCE to each of real user subaccounts (RUSAs) in the DCCE that are each associated to respective group members (GMs);
    identifying historic calendar expense records (HCERs), each having the attributes of the ER, that are associated with the CER type, and the HCER times are within a threshold time of the CER time;
    in a first determining, determining that CER type most-strongly matches the HCER type of a first of the identified HCERs relative to remaining other HCERs;
    in response to the first determining, allocating portions of the CER amount to respective RUSA amounts pursuant to allocation rules for a first expense allocation that has been historically utilized to allocate amounts of similar CER types to RUSA amounts; and
    in a second determining, determining that the CER type does not match nearby HCER types;
    in response to the second determining:
    identifying a respective group member who created the CER based on the HCERs; and
    allocating within the RUSAs the CER amount pursuant to a second expense allocation that has been historically utilized to allocate amounts of similar CER types to RUSA amounts, wherein the second expense allocation differs from the first expense allocation;
    training and improving, using the configured processor, a knowledge base of the allocation rules with respect to the ER type and the RUSAs based on feedback iterations with respect to allocation decisions, learning new allocation rules, deleting allocation rules, and revising the allocation rules based on the ER keywords, tags, text data, and metadata, wherein the training and improving comprises:
    classifying, in a first learning phase, merchants by assigning variables from a global good provider typology and a global service provider typology; and
    classifying, in another learning phase, the linking of the respective group members with the RUSAs based on an ER type and expense behaviors;
    determining a threshold of a total ER amount that each of the respective GMs can make on their RUSA without affecting an overall budget of all of the respective GMs by dynamically calculating the threshold as a function of current income inflows and expense outflows;
    dynamically updating the RUSAs as to a family type or respective group member identity based on family type or respective GM status changes; and
    analyzing a RUSA for a particular GM (PGM) (PGM-RUSA) to determine an expense behavior pattern (EBP) of the PGM (PGM-EBP) and likely expense allocations from the VGA to the PGM-RUSA, based on a strength of a match between the determined expense behavior patterns, such that each particular GM's behavior patterns are collected and used after merger of the RUSAs into the VGA to assign the expenses;
    in response to matching a first cash withdrawal by the PGM to the PGM-EBP based on a time, amount, and geographic location of the first cash withdrawal, within specified precision thresholds:
    automatically determining that the first cash withdrawal is related to a first type of expense, and allocating an amount of the first cash withdrawal between the RUSAs pursuant to allocation rules established for the first type of expense; and
    in response to not matching the first cash withdrawal:
    allocating the amount of the first cash withdrawal between the RUSAs a common expense pursuant to allocation rules established for common expenses.

2. The method of claim 1, further comprising:
integrating computer-readable program code into a computer system comprising a processor, a computer readable memory in circuit communication with the processor, and a computer readable storage medium in circuit communication with the processor;
wherein the processor executes program code instructions stored on the computer-readable storage medium via the computer readable memory and thereby performs:
the determining the CER;
the identifying the HCER;
the allocating the CER amount to the RSA pursuant to the first expense allocation; and
the identifying the PGM as responsible for generating the CER and allocating within the RUSAs in the DCCE the CER amount to RUSAs pursuant to the second expense allocation.

3. The method of claim 1, wherein the computer-readable program code is provided as a service in a cloud environment.

4. The method of claim 1, wherein:
the allocating within the RUSAs the CER amount pursuant to the second expense allocation that has been historically utilized to allocate amounts of similar CER types to RUSA amounts;
the second expense allocation differs from the first expense allocation; and
the method further comprises:
in response to determining that the CER does not match a RUSA for the PGM to determine the PGM-EBP:
determining whether the CER matches an EBP that is allocated to respective GMs as a function of their EBP; and
selecting and applying the second allocation as a function of strength of match of the CER to the second expense allocation and the EBP of a different PGM.

5. The method of claim 4, further comprising:
in response to determining that the CER most-strongly matches a CER type that is associated to a second of the respective group members by the EBP of the second respective GM, allocating an amount of the CER to the PGM that is inverse to an amount that is allocated to the second respective GM.

6. The method of claim 5, further comprising:
in response to determining that the CER does not match ER types that are allocated to the respective group members by the EBP of the respective group members, allocating an amount of the CER to the PGM that is proportionate to an amount of the CER that is allocated within HCERs to a respective group member having demographic data values that are similar to demographic data values of the PGM.

7. The method of claim 6, further comprising:
allocating the CER amount to the RUSAs in proportion to relative levels of income of the respective GMs.

8. The method of claim 7, further comprising:
allocating amounts of the CER to the RUSAs as a function of weighting CER amounts that are selected from respective GMs consisting of CER types representing strength of association to a respective GM, and confidence values of association to respective GMs.

* * * * *